United States Patent
Hamada et al.

(10) Patent No.: US 6,172,453 B1
(45) Date of Patent: Jan. 9, 2001

(54) DISCHARGE LAMP ELECTRODE

(75) Inventors: Munemitsu Hamada, Ichikawa; Masaru Fukuda, Narita; Haruo Taguchi, Nishime-machi; Shoichi Iwaya, Kisakata-machi; Hiroaki Abe, Honjo, all of (JP)

(73) Assignee: TDK Corporation, Tokyo (JP)

( * ) Notice: Under 35 U.S.C. 154(b), the term of this patent shall be extended for 0 days.

(21) Appl. No.: 08/341,617

(22) PCT Filed: Mar. 17, 1994

(86) PCT No.: PCT/JP94/00426

§ 371 Date: Nov. 17, 1994

§ 102(e) Date: Nov. 17, 1994

(30) Foreign Application Priority Data

Mar. 17, 1993 (JP) .................................................. 5-056747
Apr. 14, 1993 (JP) .................................................. 5-087542
Apr. 14, 1993 (JP) .................................................. 5-087543

(51) Int. Cl.[7] .................................................. H01J 1/02
(52) U.S. Cl. .................. 313/491; 313/630; 313/633; 252/507; 252/509; 252/520; 252/521
(58) Field of Search .................. 313/491, 574, 313/630, 633; 428/384, 386, 389, 404; 252/507, 509, 515, 520, 521

(56) References Cited

U.S. PATENT DOCUMENTS

| | | | | |
|---|---|---|---|---|
| 2,686,274 | * | 8/1954 | Rooksby | 315/388 |
| 2,888,592 | * | 5/1959 | Lafferty et al. | 313/491 X |
| 3,798,492 | * | 3/1974 | Menelly | 313/491 X |
| 3,906,271 | * | 9/1975 | Aptt, Jr. | 313/491 |
| 4,808,883 | * | 2/1989 | Iwaya et al. | 313/633 |

FOREIGN PATENT DOCUMENTS

| | | |
|---|---|---|
| 2222845 | 7/1972 | (DE) . |
| 59-035350 | 2/1944 | (JP) . |
| 55-49833 | * 4/1980 | (JP) . |
| 55-074052 | 6/1980 | (JP) . |
| 56-013652 | 10/1981 | (JP) . |
| 62-291854 | * 12/1987 | (JP) . |
| 63-15551 | * 2/1988 | (JP) . |
| 63-15552 | * 2/1988 | (JP) . |
| 63-15553 | * 2/1988 | (JP) . |
| 63-15554 | * 2/1988 | (JP) . |
| 00186550 | * 7/1990 | (JP) . |
| 2-186527 | * 7/1990 | (JP) . |
| 2-215039 | * 8/1990 | (JP) . |
| 4-43546 | * 2/1992 | (JP) . |

* cited by examiner

Primary Examiner—Ashok Patel
(74) Attorney, Agent, or Firm—The Hecker Law Group

(57) ABSTRACT

The present invention provides an electrode for a ceramic electrode fluorescent discharge lamp; an electrode material for a discharge lamp, which has high electron flow density, high thermal shock resistance, and reduced deterioration due to sputtering; and also a method for manufacturing the same. The invention makes it possible to reduce the tube diameter of the ceramic electrode fluorescent discharge lamp. An electrode material for a discharge lamp is obtained from a first component of 0.5 to 1.5 mols of BaO, CaO or SrO, a second component of 0.05 to less than 0.3 mols or more than 0.7 to 0.95 mols of $ZrO_2$ or $TiO_2$, and a third component of 0.025 to less than 0.3 mols of $V_2O_5$, $Nb_2O_5$, $Ta_2O_5$, $Sc_2O_3$, $Y_2O_3$, $La_2O_3$, $Dy_2O_3$, or $Ho_2O_3$, or 0.05 to less than 0.15 mols or more than 0.35 to 0.95 mols of $HfO_2$, $CrO_3$, $MoO_3$ or $WO_3$. This electrode material is granulated and is turned into a massive, granular, or porous electrode material. This is placed in a cylindrical semiconductor ceramic container with a closed bottom and is reduced and fired to prepare an electrode. A mercury dispenser of the ceramic electrode fluorescent discharge lamp is disposed in series between the cylindrical semiconductor ceramic container with a closed bottom and a lead-in portion of the lead wire.

7 Claims, 7 Drawing Sheets

DISCHARGE LAMP ELECTRODE

FIELD OF THE INVENTION

The present invention relates to an electrode for a backlight discharge lamp used in a liquid crystal display unit for portable personal computers or word-processors.

BACKGROUND TECHNIQUE

Rapid advancement in computer technology has enabled substantial miniaturization of portable personal computers and word-processors. In particular, so-called notebook computers no larger than standard office paper enjoy enormous popularity because of their compact size, light weight and low price.

The output display device for such computers is typically a liquid crystal display (LCD). Because liquid crystal displays are not light emitting, a light source is needed to display the LCD contents. While an external light source can be used, an internal light source is required when the external light source is too weak or where additional light is required for color display. Such an internal light source is called a backlight light source because light is radiated from the backside of the liquid crystal display, and must be a planar light source so that the entire liquid display screen can be illuminated. For this reason, a fluorescent discharge lamp combined with an electro-luminescent (EL) element or a lightguide plate is used as the backlight light source.

FIG. 1 shows an arrangement of a backlight light source using a fluorescent discharge lamp. In FIG. 1, reference numeral 1 represents a light guide plate made of a light transmitting material, such as glass or acrylic resin, provided with surface irregularities to radiate the light, which enters from the side of the plate in a planar direction. On both sides of light guide plate 1, fluorescent discharge lamps 2 are mounted as light sources to irradiate light guide plate 1.

In a common discharge lamp, gas capable of providing an electrical discharge is sealed in a tube formed of a transparent material such as glass. By applying an AC or DC voltage on discharge electrodes arranged face-to-face in the glass tube, an electrical discharge occurs via the gas and light is radiated to the outside.

In a fluorescent discharge lamp, low pressure (about 1 Pa) mercury (Hg) gas is used to provide the electrical discharge. Ultraviolet rays with a wave length of 253.7 nm are emitted from mercury gas to irradiate a fluorescent material, such as calcium halo-phosphate ($3Ca_3(PO_4)_2$ CaFCl/Sb, Mn), which coats the inner wall of the glass tube. The ultraviolet rays are converted to visible light.

Also, argon (Ar) gas under pressure of several hundreds of Pa is introduced into the mercury gas to facilitate the electrical discharge by promoting ionization of the mercury gas (Penning effect).

FIG. 2a is a cross-sectional view of a fluorescent discharge lamp used for a conventional backlight light source. FIG. 2b is an enlarged cross-sectional view of the portion in the circle "b" of the tube end in FIG. 2a.

In these figures, reference numeral 21 represents a cylindrical, sealed glass tube container with an inner wall coated with a fluorescent material. On the left and right lateral ends of glass tube container 21, lead wires 22 are disposed. Tungsten (wolfram) filaments 23 coated with an electron emitting material such as barium oxide (BaO) are mounted on the tip of lead wires 22. Mercury dispensers 24 are arranged between filaments 23 and the tube ends.

In a conventional hot cathode, a tungsten filament coated with an electron emitting material such as SrO or CaO is usually adopted as an electrode material for a fluorescent lamp with the above arrangement. For a hot cathode, a preheating circuit is needed resulting in higher cost for the system. Also, a hot cathode consumes more power and the restriking voltage is high. Mercury ions generated during an electrical discharge are accelerated in the strong electric field in front of the cathode and collide with the electrodes. The collision splashes electrode material, leading to a phenomenon called sputtering. This shortens the service life of the electrodes and causes blackening of the tube ends near the electrodes.

To generate the mercury gas for electrical discharge, when manufacturing fluorescent discharge lamps, after the argon gas for starting the electrical charge is placed in the tube, the tube ends are closed to seal the entire tube. Then, mercury dispensers 24 are heated using a high frequency induction heater to decompose the $Ti_3Hg$ sealed within it and discharge mercury vapor inside the tube. The mercury vapor thus discharged fills glass tube container 21 and generates ultraviolet rays via electrical discharge.

Because the filament serving as the hot cathode must have a certain size, it is not possible to reduce the inner diameter of the glass tube. The outer diameter of a normal glass tube is about 8 mm.

For notebook computers, in which a fluorescent discharge lamp is used as the backlight light source, there are strong demands for more compact design and energy-savings. This naturally leads to demands for an energy-saving and thin-type design of the backlight light source.

To cope with such demands, a cold cathode fluorescent discharge lamp without a filament has been proposed. FIG. 3 is an enlarged cross-sectional view of the tube end of such a lamp. In the cold cathode discharge lamp, cold cathode 25, also serving as a mercury dispenser, is mounted on lead wire 26 instead of the filament and mercury dispenser of the hot cathode discharge lamp shown in FIGS. 2a and 2b.

Since the cold cathode fluorescent discharge lamp has no hot cathode, unlike the hot cathode type fluorescent discharge lamp of FIG. 2, power consumption is low and the service life of the lamp is long. Because a filament is not used, it is possible to reduce inner diameter of the glass tube. The outer diameter of the glass tube is usually designed to be about 4 mm.

Nickel metal is used as the material for the cold cathode. Since nickel metal has a low electron emission property, it is not possible to increase the luminance, and the electrical discharge starting voltage is high.

U.S. Pat. No. 2,686,274 discloses a discharge electrode using ceramics, which is produced by turning ceramics such as $BaTiO_3$ into a semiconductor by reduction processing. However, semiconductor ceramics in massive, granular or porous state are vulnerable to the impact of ions such as mercury ions and ions of rare gases including argon (Ar), neon (Ne), xenon (Xe), krypton (Kr), etc. Thus, the electron emission property deteriorates due to sputtering caused by the collision of ions.

To solve the above problems, a ceramic semiconductor electrode material having an anti-sputtering layer on the surface thereof and a method for manufacturing such an electrode material is disclosed in U.S. Pat. No. 4,808,883 Japanese Patent Laid-Open Publication 62-291854) and Japanese Patent Laid-Open Publications 55-49833, 2-186527, 2-186550 and 2-215039. However, there are still strong demands on material compositions having better properties as well as strong demands for more stable manufacturability.

A fluorescent discharge lamp electrode using the above ceramic semiconductor electrode material is disclosed in U.S. Pat. No. 4,808,883 (Japanese Patent Laid-pen Publications 62-291854, Japanese Utility Model Laid-Open Publications 63-15551, 63-15552, 63-15553, and 63-15554) and Japanese Patent Laid-Open Publications 2-186527-2-186550 and 2-215039.

The fluorescent discharge lamp electrode as described above comprises a solid ceramic semiconductor that has difficulty maintaining high temperature for electron emission. Japanese Patent Laid-Open Publication 4-43546 discloses a fluorescent discharge lamp electrode in which a ceramic semiconductor is formed in granular shape and is placed in a heat-resistant ceramic container to solve this problem.

FIG. 4a is a cross-sectional view of a ceramic electrode fluorescent discharge lamp disclosed in Japanese Patent Laid-Open Publication 4-43546. FIG. 4b is a cross-sectional view of a discharge lamp electrode. In FIGS. 4a and 4b, reference numeral 21 represents a glass tube containing argon gas and reference numeral 27 is an electrode cylinder. Glass tube 21 is a container having a cylindrical cross-section On the left and right lateral ends of glass tube 21, a lead wire 28, made of heat-resistant metal such as tungsten, is disposed and a retainer 29 for retaining electrode cylinder 27 is disposed on the tip of each lead wire 28. Retainer 29 is made of an elastic and electrically conductive material designed to elastically hold the outer periphery of electrode cylinder 27. Mercury dispenser 30 is provided in parallel to each lead wire 28, and a predetermined quantity of argon gas is sealed in the glass tube 21.

Electrode cylinder 27 comprises semiconductor ceramics with a closed bottom and one end open, and having a high melting point or good anti-sputtering property (e.g. semiconductor ceramics of $Ba(Zr,Ta)O_3$ type). Cylinder 27 is elastically held by branches 31 disposed on retainer 29 at the end of lead wire 28. In a hollow portion 32 of the electrode cylinder 27, massive, granular or porous semiconductor ceramics 33 having an electron emission property are contained. On the surface of electrode cylinder 27, an anti-sputtering layer made of Ta is formed.

The size of electrode cylinder 27 is, for example, 0.9 mm in inner diameter, 1.9 mm in outer diameter, 23 mm in length, or 1.6 mm in inner diameter, 2.6 mm in outer diameter, and 2.3 mm in length.

Mercury dispenser 30 of the ceramic electrode fluorescent discharge lamp is placed outside retainer 29, adjacent in a radial direction to electrode cylinder 27.

In the ceramic electrode fluorescent discharge lamp, when the electrical discharge is started by the argon gas, ionized gas generates plasma near the discharge electrode, and the electron emitting semiconductor ceramics 33 are heated by the plasma. Thus, semiconductor ceramics 33 act as a hot cathode.

Because this ceramic electrode fluorescent discharge lamp has no filament, power consumption is low, and the problem of short life due to loss of electron emitting material via sputtering is avoided. Also, because it is of the hot cathode type, unlike the cold cathode type, it is possible to reduce the discharge starting voltage and to increase luminance.

However, mercury dispenser 30 is disposed at a position adjacent to electrode cylinder 27, and the outer diameter of the glass tube cannot be reduced. As a result, the requirements for the backlight light source of a notebook computer are not completely satisfied.

DISCLOSURE OF THE INVENTION

It is a first object of the present invention to provide an electrode and an electrode material which has high electron flow density and high thermal shock resistance, and which can reduce deterioration due to sputtering, and also a method for manufacturing the same.

The first aspect of the present invention is an electrode material for a discharge lamp comprising a first component selected from 0.5 to 1.5 mols of BaO, CaO or SrO, a second component selected from 0.05 to 0.95 mol of $ZrO_2$ or $TiO_2$, and a third component selected from 0.025 to 0.475 mol of $V_2O_5$, $Nb_2O_5$, $Ta_2O_5$, $Sc_2O_3$, $Y_2O_3$, $La_2O_3$, $Dy_2O_3$, or $Ho_2O_3$, or 0.05 to 0.95 mol of $HfO_2$, $CrO_3$, $MoO_3$ or $WO_3$. The second aspect of the present invention is a method for manufacturing an electrode material for discharge lamp whereby each of the above components is mixed and crushed, and the materials thus mixed and crushed are calcinated, and the materials thus calcinated are crushed again and then mixed and granulated. The materials thus granulated are filled into an electrode container and then reduced and fired. Further, a third aspect of the present invention is an electrode for a discharge lamp characterized in that a massive, granular, or porous electrode material comprising a first component selected from 0.5 to 1.5 mols of BaO, CaO or SrO, a second component selected from 0.05 to 0.95 mol of $ZrO_2$ or $TiO_2$, and a third component selected from 0.025 to 0.475 mol of $V_2O_5$, $Nb_2O_5$, $Ta_2O_5$, $Sc_2O_3$, $Y_2O_3$, $La_2O_3$, $Dy_2O_3$, or $Ho_2O_3$, or 0.05 to 0.95 mol of $HfO_2$, $CrO_3$, $MoO_3$ or $WO_3$ is accommodated in a cylindrical semiconductor ceramic container with a closed bottom.

By crushing the above composition to 2.5 $\mu$m or less in average particle size, and by reducing and firing it, ceramics having a conductor or a semiconductor coating layer can be produced in broad composition range and firing temperature range.

In the first aspect of the invention using the above arrangement, there is no need for preheating an electrode in which massive, granular, or porous ceramics, prepared as above, are accommodated in the bore of a cylindrical ceramic container with a closed bottom. Since it has a low thermal conductivity, it is brought to a high temperature as soon as electron emission is started. Stable temperature conditions can be maintained, and electron flow can be emitted with a high density.

The second aspect of the invention is a ceramic electrode fluorescent discharge lamp, comprising a mercury dispenser disposed with an electrode cylinder in order to reduce the diameter of the glass tube of a ceramic electrode fluorescent discharge lamp and to provide a fluorescent discharge lamp suitable for use as a backlight light source of a notebook computer. In one embodiment, an electrode for a discharge lamp comprises electron emitting semiconductor ceramics accommodated within a semiconductor ceramic cylinder with a closed bottom. The cylinder is supported on the end of a lead wire in the end of a glass tube containing an electrically discharge gas. A mercury dispenser is fixed on the lead wire between the cylinder and a lead-in portion of the lead wire. In another embodiment, the mercury dispenser is disposed adjacent to the cylinder.

In the above arrangement, during the manufacture of the discharge lamp, mercury vapor for providing the electrical discharge is released from the mercury dispenser that is fixed in the middle of the lead wire or disposed between the semiconductor ceramic cylinder and the lead-in portion of the lead wire, adjacent to the semiconductor ceramic cylinder. When the discharge lamp is used, electrons are released from the electron emitting semiconductor ceramics accommodated in the semiconductor ceramic cylinder disposed at the end of the lead wire, and electrical discharge occurs.

BRIEF DESCRIPTION OF THE DRAWINGS

FIG. 9b is a cross-sectional view taken along line b—b of FIG. 9a.

FIG. 12b is a cross-sectional view taken along line b—b of FIG. 12a.

FIG. 13b is a cross-sectional view taken along line b—b of FIG. 13a.

BEST MODE FOR CARRYING OUT THE INVENTION

The following is a description of various embodiments of the present invention that refers to the accompanying drawings and tables.

Figure 5:
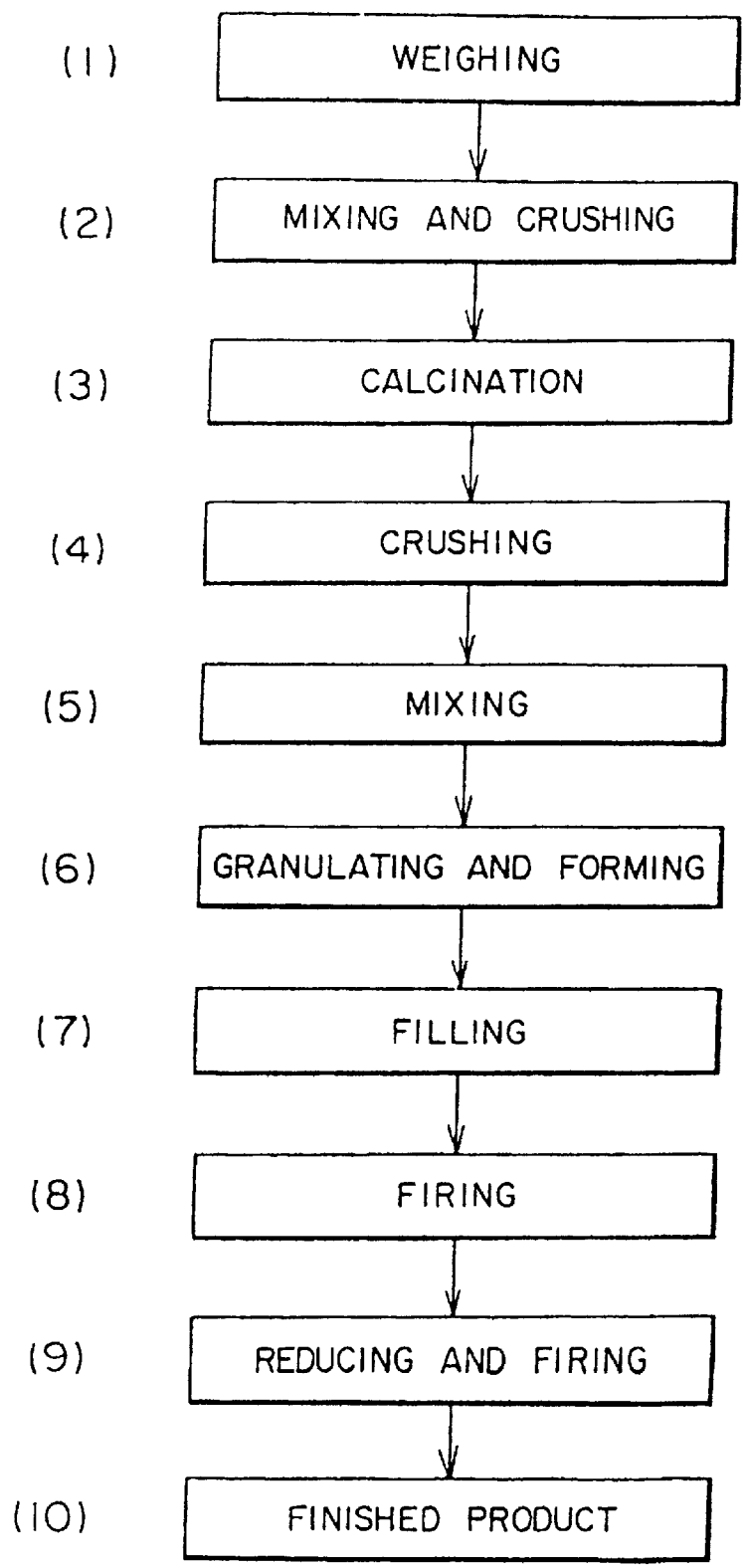
FIG. 5 is a flow chart of a method for manufacturing an electrode according to the present invention.

First, the method for manufacturing an electrode material according to the present invention is described in connection with FIG. 5.

The entire process is similar to a normal process for manufacturing ordinary ceramics, including processes of mixing, crushing, calcinating, crushing and granulating and forming. Further, processes of filling, firing and reducing and firing for manufacturing an electrode are added. The process is as follows:

(1) Weighing
(2) Mixing and crushing
(3) Calcination
(4) Crushing
(5) Mixing
(6) Granulating and forming
(7) Filling
(8) Firing
(9) Reducing and firing
(10) Finished product Next, the details of each of these processes and the physical properties obtained by each process is described.

(1) In the weighing process, raw materials, i.e. carbonate of Ba, Sr, or Ca (e.g. $BaCO_3$), titanium oxide or zirconium oxide ($ZrO_2$), $Ta_2O_5$ or $Nb_2O_5$, etc., are weighed.

(2) In the mixing and crushing process, the weighed raw materials are placed into a pot and are mixed and crushed using agate or zirconia balls of 5 mm in particle size.

(3) In the calcination process, the materials thus mixed and crushed are calcinated at the temperature of 1100 to 1200° C.

(4) After calcination, the materials are crushed using agate or zirconia balls. This crushing is performed for 40 hours or more to obtain a fine powdery material.

(5) To the fine powder thus obtained, an adequate quantity of polyvinyl alcohol is added and mixed.

(6) The mixed material is then granulated.

(7) The granules thus prepared are placed into a cylindrical electrode container with a closed bottom. The container is made of semiconductor ceramics having a high melting point and good anti-sputtering properties, i.e. a semiconductor ceramics of $Ba(Zr,Ta)O_3$ type.

(8) In the firing process, the product is fired for about 2 hours in an air atmosphere of 1300 to 1800° C. (or more preferably, in an oxygen atmosphere of about 1500° C.). This process may be omitted in relation to the subsequent reducing and firing process.

(9) The temperature for reducing and firing is 1200 to 2300° C., or more preferably 1400 to 1700° C. By controlling the atmosphere, nitride coating, carbide coating or both are obtained.

For example, to obtain nitride coating, the material is fired in a nitrogen atmosphere containing hydrogen (may contain argon). To obtain carbide coating, the material is buried in a carbon powder and is fired in an inert gas atmosphere such as nitrogen or argon.

(10) As the result of reduction, the ceramic material is turned into a semiconductor, and a film containing Ta or Nb as a principal component is deposited in a thickness of 2 to 3 $\mu$m on the surface to prevent sputtering.

Table 1 shows physical properties of the electrode materials manufactured by the method of the present invention, in which 1.0 mol of BaO, 0.8 mol of $ZrO_2$, and 0.1 mol of $Ta_2O_5$ are weighed as raw materials, and the raw materials thus weighed are placed into a pot to be mixed and crushed using agate or zirconia balls of 5 mm in particle size.

In the physical properties, thermal shock resistance is defined as follows: The sample is retained in an electric furnace kept at a constant temperature, and the sample is dropped into water bath after 10 minutes. This is performed with varying temperature differences. Anti-bending strength of the sample is determined by three-point bending test, and the temperature difference where the strength is decreased by more than 50% of the initial value is defined as thermal shock resistance (° C.).

TABLE 1

| Crushing media | Crushing time (hr) | Average particle size (μm) | Surface resistance (Ω/□) | Internal resistance (Ω/cm) | Surface layer thickness (μm) | Thermal shock resistance (° C.) |
|---|---|---|---|---|---|---|
| Agate | 10 | 3.8 | Insul'n | Insul'n | — | 100 |
|  | 20 | 3.0 | Insul'n | Insul'n | — | 150 |
|  | 40 | 2.5 | 1.2 | 4.1 | 1.2 | 270 |
| Zirconia balls (5 mmφ) | 10 | 2.5 | 1.3 | 3.8 | 1.4 | 280 |
|  | 20 | 1.4 | 1.6 | 4.0 | 1.6 | 320 |
|  | 40 | 0.8 | 1.0 | 2.5 | 1.8 | 350 |

Table 2 summarizes physical properties of the electrode materials manufactured by the method of the present invention, in which 1.0 mol of BaO, 0.2 mol of $ZrO_2$, and 0.4 mol of $Ta_2O_5$ are weighed as raw materials, and the weighed raw materials are placed into a pot to be mixed and crushed using agate or zirconia balls of 5 mm in particle size.

TABLE 2

| Crushing media | Crushing time (hr) | Average particle size (μm) | Surface resistance (Ω/□) | Internal resistance (Ω/cm) | Surface layer thickness (μm) | Thermal shock resistance (° C.) |
|---|---|---|---|---|---|---|
| Agate | 10 | 3.7 | Melt | — | — | — |
|  | 20 | 3.0 | Melt | — | — | — |
|  | 40 | 2.5 | 0.72 | 0.81 | 2.2 | 340 |
| Zirconia balls (5 mmφ) | 10 | 2.5 | 0.71 | 0.80 | 2.4 | 350 |
|  | 20 | 1.3 | 0.63 | 0.75 | 2.5 | 360 |
|  | 40 | 0.7 | 0.60 | 0.65 | 2.6 | 370 |

Among the cases shown in Table 1, those having average particle size of 3.8 μm and 3.0 μm are turned into insulating materials and cannot be used for the intended purpose.

Among the cases shown in Table 2, those having average particles size of 3.7 μm and 3.0 μm are melted and are not turned into ceramics. Thus, these cannot be used for the purpose.

On the other hand, the materials having average particle size of 2.5 μm or less are turned into semiconductor ceramics.

This means that average particle size must be 2.5 μm.

Table 3 shows physical properties of Samples 1 to 15, for which 1.0 mol of BaO is used and the quantities of $ZrO_2$ and $Ta_2O_5$ are changed, as raw materials.

TABLE 3

| Sample No. | Composition (mol) | | | Surface resistance (Ω/□) | Internal resistance (Ω/cm) | Surface layer thickness (μm) | Thermal shock resistance (° C.) |
|---|---|---|---|---|---|---|---|
|  | BaO | $ZrO_2$ | $Ta_2O_5$ |  |  |  |  |
| 1 | 1.0 | 0.98 | 0.01 | Insul'n | Insul'n | — | 150 |
| 2 | 1.0 | 0.95 | 0.025 | 2.4 | 7.2 | 1.2 | 250 |
| 3 | 1.0 | 0.80 | 0.10 | 1.3 | 3.8 | 1.4 | 280 |
| 4 | 1.0 | 0.5 | 0.25 | 0.53 | 0.61 | 3.0 | 370 |
| 5 | 1.0 | 0.20 | 0.40 | 0.71 | 0.80 | 2.4 | 350 |
| 6 | 1.0 | 0.05 | 0.475 | 0.83 | 0.96 | 2.3 | 340 |
| 7 | 1.0 | 0.02 | 0.49 | Melt | — | — | — |
| 8 | 1.0 | 0.5 | 0.01 | Insul'n | Insul'n | — | 120 |
| 9 | 1.0 | 0.5 | 0.025 | 0.90 | 1.2 | 1.6 | 310 |
| 10 | 1.0 | 0.5 | 0.475 | 0.52 | 0.72 | 2.1 | 350 |
| 11 | 1.0 | 0.5 | 0.49 | Melt | — | — | — |
| 12 | 1.0 | 0.02 | 0.25 | Insul'n | Insul'n | — | 140 |
| 13 | 1.0 | 0.05 | 0.25 | 1.2 | 1.3 | 1.4 | 290 |
| 14 | 1.0 | 0.95 | 0.25 | 0.80 | 5.4 | 1.5 | 320 |
| 15 | 1.0 | 0.98 | 0.25 | Melt | — | — | — |

According to Table 3, when 0.02 mol of $ZrO_2$ and 0.98 mol of $ZrO_2$ are used, the material is turned into insulation or melted, and thus, these cases are not suitable for practical application (Samples 1, 7, 12 and 15).

When 0.01 mol of $Ta_2O_5$ is used, the material is turned into insulation (Samples 1 and 8), and when 0.49 mol of $Ta_2O_5$ is used, it is melted. Even when 0.25 mol of $Ta_2O_5$ is used, it is melted if 0.98 mol of $ZrO_2$ is used (Samples 7, 11 and 15), and all of these cases are not suitable for practical application.

When 0.025 to 0.475 mol of $Ta_2O_5$ is used, a conductor or semiconductor layer containing Ta in thickness of several μm is formed on the surface of the semiconductor ceramics (Samples 2, 3, 4, 5, 6, 9, 10, 13, and 14). Therefore, when 0.05 to 0.95 mol of $ZrO_2$ is used, 0.025 to 0.475 mol of $Ta_2O_5$ is also used.

Table 4 shows physical properties of Samples 16 to 24, for which 1.0 mol of BaO and 0.5 mol of $ZrO_2$ are used and the quantities of $Ta_2O_5$ and $Nb_2O_5$ are changed, as raw materials.

TABLE 4

| Sample No. | Composition (mol) | | | | Surface resistance (Ω/□) | Internal resistance (Ω/cm) | Surface layer thickness (μm) | Thermal shock resistance (° C.) |
|---|---|---|---|---|---|---|---|---|
|  | BaO | $ZrO_2$ | $Ta_2O_5$ | $Nb_2O_5$ |  |  |  |  |
| 16 | 1.0 | 0.5 | 0.005 | 0.005 | Insul'n | $5 \times 10^{13}$ | — | 140 |
| 17 | 1.0 | 0.5 | 0.005 | 0.02 | 1.4 | 2.7 | 1.7 | 300 |
| 18 | 1.0 | 0.5 | 0.005 | 0.245 | 0.82 | 0.69 | 1.8 | 310 |
| 19 | 1.0 | 0.5 | 0.005 | 0.47 | 0.59 | 0.50 | 2.1 | 330 |
| 20 | 1.0 | 0.5 | 0.005 | 0.485 | Melt | — | — | — |
| 21 | 1.0 | 0.5 | 0.25 | 0.225 | 3.2 | 4.2 | 1.9 | 320 |
| 22 | 1.0 | 0.5 | 0.25 | 0.24 | Melt | — | — | — |
| 23 | 1.0 | 0.5 | 0.47 | 0.005 | 5.4 | 7.2 | 2.1 | 340 |
| 24 | 1.0 | 0.5 | 0.47 | 0.02 | Melt | — | — | — |

According to Table 4, when a total of 0.01 mol of $Nb_2O_5$ and $Ta_2O_5$ is used, the material is turned into insulating material, and when a total of 0.49 mol of $Nb_2O_5$ and $Ta_2O_5$ is used, it is melted. These cases are not suitable for practical application (Samples 16, 20, 22, and 24).

When a total of 0.025 to 0.475 mol of $Nb_2O_5$ and $Ta_2O_5$ is used, a conductor or semiconductor layer containing principal components Nb and Ta in thickness of several $\mu$m is formed on the surface of the semiconductor ceramics. Therefore, 0.025 to 0.475 mol in total of $Nb_2O_5$ and $Ta_2O_5$ is used.

Table 5 shows physical properties of Samples 25 to 36, for which as raw materials, 1.0 mol of BaO and 0.5 mol of $ZrO_2$ are used and 0.25 mol of $V_2O_5$, $Nb_2O_5$, $Ta_2O_5$, $Sc_2O_3$, $Y_2O_3$, $La_2O_3$, $Dy_2O_3$, or $Ho_2O_3$, or 05 mol of $HfO_2$, $CrO_3$, $MoO_3$ or $WO_3$ is added.

TABLE 5

| Sample No. | Composition (mol) | | | Surface resistance ($\Omega/\square$) | Internal resistance ($\Omega$/cm) | Surface layer thickness ($\mu$m) | Thermal shock resistance (° C.) |
|---|---|---|---|---|---|---|---|
| | 1.0 | 1.0 | 0.25/0.5 | | | | |
| 25 | BaO | $ZrO_2$ | $V_2O_5$ | 0.57 | 0.62 | 2.3 | 340 |
| 26 | BaO | $ZrO_2$ | $Nb_2O_5$ | 0.68 | 0.72 | 2.4 | 350 |
| 27 | BaO | $ZrO_2$ | $Ta_2O_5$ | 0.53 | 0.61 | 3.0 | 370 |
| 28 | BaO | $ZrO_2$ | $Sc_2O_3$ | 0.72 | 0.74 | 2.6 | 340 |

TABLE 5-continued

| Sample No. | Composition (mol) | | | Surface resistance ($\Omega/\square$) | Internal resistance ($\Omega$/cm) | Surface layer thickness ($\mu$m) | Thermal shock resistance (° C.) |
|---|---|---|---|---|---|---|---|
| | 1.0 | 1.0 | 0.25/0.5 | | | | |
| 29 | BaO | $ZrO_2$ | $Y_2O_3$ | 0.89 | 0.91 | 2.5 | 360 |
| 30 | BaO | $ZrO_2$ | $La_2O_3$ | 0.92 | 0.98 | 2.7 | 320 |
| 31 | BaO | $ZrO_2$ | $Dy_2O_3$ | 0.97 | 0.10 | 2.6 | 310 |
| 32 | BaO | $ZrO_2$ | $Ho_2O_3$ | 0.96 | 0.11 | 2.3 | 320 |
| 33 | BaO | $ZrO_2$ | $HfO_2$ | 0.88 | 0.10 | 2.4 | 330 |
| 34 | BaO | $ZrO_2$ | $CrO_3$ | 0.83 | 0.92 | 2.5 | 310 |
| 35 | BaO | $ZrO_2$ | $MoO_3$ | 0.82 | 0.94 | 2.6 | 320 |
| 36 | BaO | $ZrO_2$ | $WO_3$ | 0.85 | 0.97 | 2.8 | 340 |

From Table 5, it is evident that a conductor or semiconductor layer of several $\mu$m in thickness is formed on the surface of the semiconductor ceramics even when $Ta_2O_5$ is replaced by oxides of V, Ta, Sc, Y, La, Dy, Ho, Hf, Cr, Mo, or W.

Table 6 shows physical properties of Samples 37 to 49, for which 0.25 mol of $Ta_2O_5$ is used and the quantities of BaO, $ZrO_2$ and $TiO_2$ are changed, as raw materials.

TABLE 6

| Sample No. | Composition (mol) | | | | Surface resistance ($\Omega/\square$) | Internal resistance ($\Omega$/cm) | Surface layer thickness ($\mu$m) | Thermal shock resistance (° C.) |
|---|---|---|---|---|---|---|---|---|
| | BaO | $ZrO_2$ | $TiO_2$ | $Ta_2O_5$ | | | | |
| 37 | 1.0 | 0.01 | 0.01 | 0.25 | Non-sintered | — | — | — |
| 38 | 1.0 | 0.01 | 0.04 | 0.25 | 0.92 | 1.1 | 1.6 | 300 |
| 39 | 1.0 | 0.01 | 0.49 | 0.25 | 0.58 | 0.65 | 1.9 | 320 |
| 40 | 1.0 | 0.01 | 0.94 | 0.25 | 0.53 | 0.62 | 2.0 | 340 |
| 41 | 1.0 | 0.01 | 0.97 | 0.25 | Melt | — | — | — |
| 42 | 1.0 | 0.5 | 0.45 | 0.25 | 0.72 | 1.2 | 2.1 | 350 |
| 43 | 1.0 | 0.5 | 0.48 | 0.25 | Melt | — | — | — |
| 44 | 1.0 | 0.94 | 0.01 | 0.25 | 0.63 | 1.1 | 1.9 | 340 |
| 45 | 1.0 | 0.94 | 0.04 | 0.25 | Melt | — | — | — |
| 46 | 0.3 | 0.5 | — | 0.25 | Melt | — | — | — |
| 47 | 0.5 | 0.5 | — | 0.25 | 1.2 | 2.4 | 2.1 | 350 |
| 4 | 1.0 | 0.5 | — | 0.25 | 0.53 | 0.61 | 3.0 | 370 |
| 48 | 1.5 | 0.5 | — | 0.25 | 2.2 | 5.2 | 2.7 | 320 |
| 49 | 1.7 | 0.5 | — | 0.25 | Insul'n | $6 \times 10^{13}$ | — | 140 |

From this table, it is evident that, when a total of 0.02 mol of $ZrO_2$ and $TiO_2$ is used, the material cannot be sintered (Sample 37). When a total of 0.98 mol of $ZrO_2$ and $TiO_2$ is used, it is melted (Samples 41, 43 and 45). When 0.5 mol of $ZrO_2$ is used while $TiO_2$ is not used and 0.3 mol of BaO is used, it is melted (Sample 46). When 1.7 mols of BaO is used, it is turned into insulating material (Sample 49).

When a total of 0.05 to 0.95 mol of $ZrO_2$ and $TiO_2$ and 0.5 to 1.5 mols of BaO are used, a conductor or semiconductor layer containing a principal component Ta of several $\mu$m in thickness is formed on the surface of the semiconductor ceramics.

Table 7 shows physical properties of Samples 50 to 54, for which 0.5 mol of $ZrO_2$ and 0.25 mol of $Ta_2O_5$ are used and the quantities of BaO, SrO and CaO are changed, as raw materials.

TABLE 7

| Sample No. | Composition (mol) | | | | | Surface resistance (Ω/□) | Internal resistance (Ω/cm) | Surface layer thickness (μm) | Thermal shock resistance (° C.) |
| --- | --- | --- | --- | --- | --- | --- | --- | --- | --- |
| | BaO | SrO | CaO | $ZrO_2$ | $Ta_2O_5$ | | | | |
| 50 | 0 | 1.0 | | 0.5 | 0.25 | 0.62 | 0.72 | 2.5 | 360 |
| 51 | 0 | | 1.0 | 0.5 | 0.25 | 0.72 | 0.93 | 2.1 | 300 |
| 52 | 0.5 | 0.5 | | 0.5 | 0.25 | 0.55 | 0.87 | 2.4 | 340 |
| 53 | 0.5 | | 0.5 | 0.5 | 0.25 | 0.51 | 0.91 | 2.1 | 350 |
| 54 | 0.5 | 0.2 | 0.25 | 0.5 | 0.25 | 0.54 | 0.92 | 2.2 | 340 |

From this table, it is evident that, when 0.5 mol of BaO is used and a total of 1 mol of BaO+SrO+CaO is used, a conductor layer or a semiconductor layer containing a principal component Ta of several μm in thickness is formed on the surface of the semiconductor ceramics.

Table 8 summarizes the data of internal resistance of the materials that i were manufactured using 1.0 mol of BaO, 0.8 mol of $ZrO_2$, and 0.1 mol of $Ta_2O_5$ as raw materials as in Table 1, by varying particle size and firing temperature.

TABLE 8

| Particle size (μm) | 1100° C. | 1200° C. | 1300° C. | 1500° C. | 1600° C. | 1800° C. | 2300° C. | 2500° C. |
| --- | --- | --- | --- | --- | --- | --- | --- | --- |
| 3.0 | Insul'n | Insul'n | Insul'n | Insul'n | Insul'n | Melt | Melt | Melt |
| 2.5 | Insul'n | 6.2 | 4.2 | 3.8 | 3.8 | 5.2 | 9.2 | Melt |
| 1.7 | Insul'n | 5.8 | 5.2 | 4.0 | 3.9 | 6.2 | 9.8 | Melt |

Table 9 gives the data on internal resistance of the materials that were manufactured using 1.0 mol of BaO, 0.2 mol of $ZrO_2$ and 0.4 mol of $Ta_2O_5$ as raw materials, by varying particle size and firing temperature.

TABLE 9

| Particle size (μm) | 1100° C. | 1200° C. | 1300° C. | 1500° C. | 1600° C. | 1800° C. | 2300° C. | 2500° C. |
| --- | --- | --- | --- | --- | --- | --- | --- | --- |
| 3.0 | Insul'n | Insul'n | Melt | Melt | Melt | Melt | Melt | Melt |
| 2.5 | Insul'n | 1.3 | 1.4 | 8.0 | 8.1 | 5.2 | 7.8 | Melt |
| 1.7 | Insul'n | 1.7 | 1.5 | 7.5 | 7.6 | 8.2 | 9.2 | Melt |

From Tables 8 and 9, it is evident that firing temperature range is extended by decreasing the particle size of the crushed materials.

Table 10 shows physical properties of Samples 55 to 61, which have the same composition and underwent the same processes as Samples 2, 4, 6, 9, 10, 13 and 14 shown in Table 3 and for which reducing and firing were not carried out, and hence a conductor layer or a semiconductor layer was not formed on the surface of the ceramics.

TABLE 10

| Sample No. | Composition (mol) | | | Surface resistance ($\Omega/\square$) | Internal resistance ($\Omega$/cm) | Surface layer thickness ($\mu$m) | Thermal shock resistance (° C.) |
|---|---|---|---|---|---|---|---|
| | BaO | ZrO$_2$ | Ta$_2$O$_5$ | | | | |
| 4 | 1.0 | 0.5 | 0.25 | 0.53 | 0.61 | 3.0 | 370 |
| 55 | 1.0 | 0.5 | 0.25 | 200K< | 6.2 | 0 | 150 |
| 2 | 1.0 | 0.95 | 0.025 | 2.4 | 7.2 | 1.2 | 250 |
| 56 | 1.0 | 0.95 | 0.025 | 200K | 9.2 | 0 | 160 |
| 6 | 1.0 | 0.05 | 0.475 | 0.83 | 0.96 | 2.3 | 340 |
| 57 | 1.0 | 0.05 | 0.475 | 200K< | 1.2 | 0 | 140 |
| 9 | 1.0 | 0.5 | 0.025 | 0.90 | 1.2 | 1.6 | 310 |
| 58 | 1.0 | 0.5 | 0.025 | 200K< | 8.3 | 0 | 130 |
| 10 | 1.0 | 0.5 | 0.475 | 0.52 | 0.72 | 2.1 | 350 |
| 59 | 1.0 | 0.5 | 0.475 | 200K< | 0.22 | 0 | 140 |
| 13 | 1.0 | 0.05 | 0.025 | 1.2 | 1.3 | 1.4 | 290 |
| 60 | 1.0 | 0.05 | 0.25 | 200K< | 1.9 | 0 | 150 |
| 14 | 1.0 | 0.95 | 0.25 | 0.80 | 5.4 | 1.5 | 320 |
| 61 | 1.0 | 0.95 | 0.25 | 200K< | 7.2 | 0 | 160 |

From Table 10, it is evident that, if a conductor or semiconductor layer is not formed on the surface of the ceramics, surface resistance increases and the material is not suitable for practical application.

Summing up the above results, when a surface deposit layer containing Ta as a principal component is not formed under low reducing conditions (e.g. reducing temperature is 1200° C. with H$_2$ as 1% and N$_2$ as 99%) with the same composition as Samples 2, 4, 6, 9, 10, 13, 14 and 55 to 61, thermal shock resistance is about 150° C., while thermal shock resistance is improved to 100° C. or more if the surface deposit layer containing Ta as a principal component is formed.

Next, description will be given for an embodiment in which the discharge lamp electrode material of the present invention is used for the discharge lamp electrode shown in FIG. 4.

Figure 1:
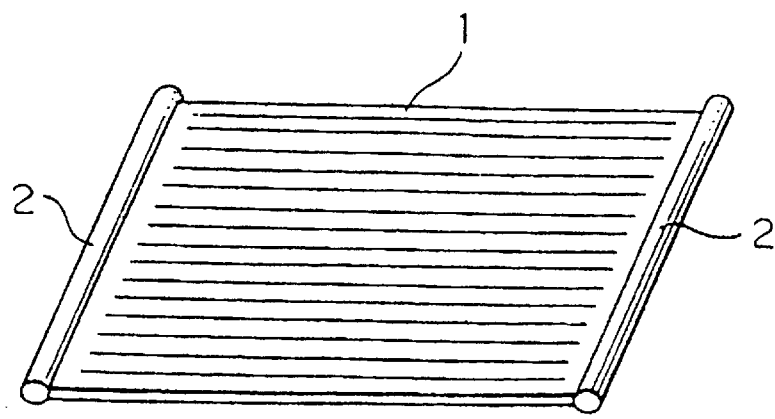
FIG. 1 is a perspective view of a backlight for a liquid crystal display unit, in which a fluorescent discharge lamp is used.
Figure 2A:
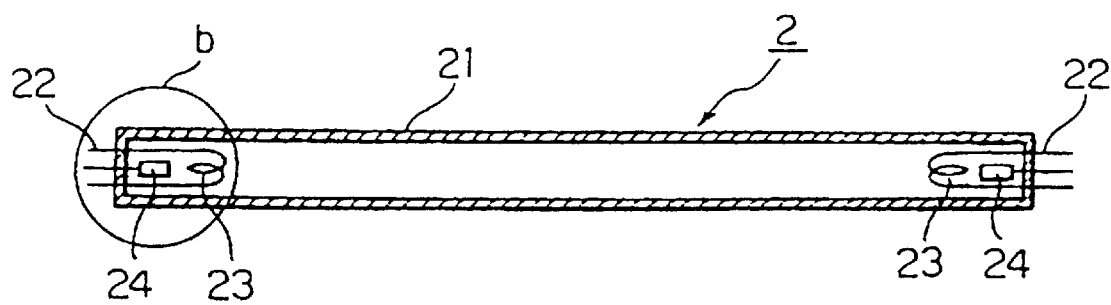
FIGS. 2a and 2b represent a general cross-sectional view of a conventional fluorescent discharge lamp for backlighting and a cross-sectional view of a tube end, respectively.
Figure 2B:
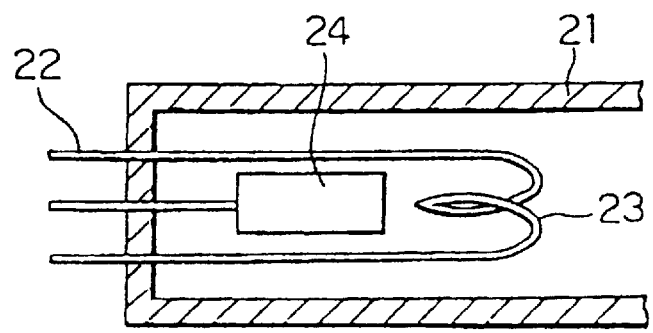
Figure 3:
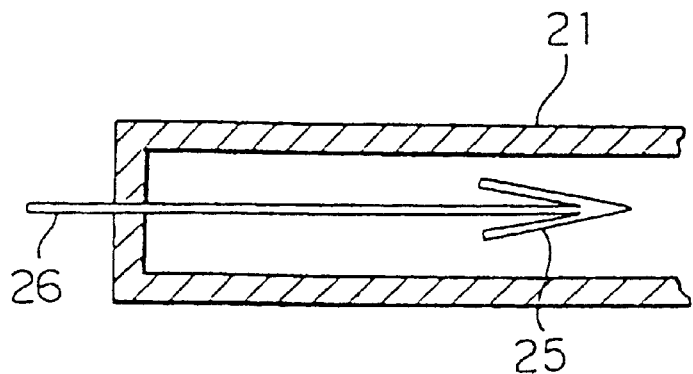
FIG. 3 is a cross-sectional view of the tube end of another conventional fluorescent discharge lamp.
Figure 4A:
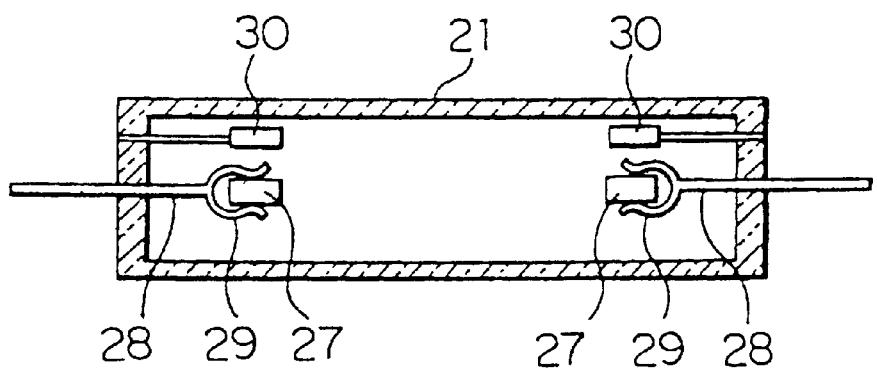
FIGS. 4a and 4b show a general cross-sectional view of still another conventional fluorescent discharge lamp and a cross-sectional view of an electrode cylinder, respectively.
Figure 4B:
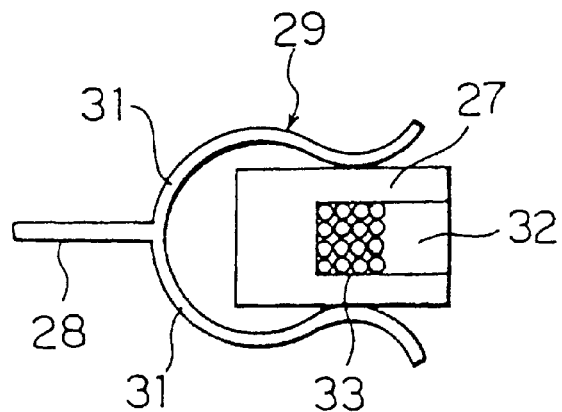

The basic arrangement of the ceramic electrode discharge lamp of the present invention is the same as the arrangement of the conventional ceramic electrode discharge lamp shown in FIG. 4. Detailed description is not given here for the ceramic electrode discharge lamp of the present invention in the embodiments given below.

In this embodiment, the thermal conductivity of the semiconductor ceramics 33 accommodated in the cylindrical hollow portion 32 of electrode cylinder 27 (with closed bottom) can be lowered by making it in massive, granular, or porous state. Thus, it is possible to maintain a high, stable temperature as soon as the electrical discharge is started. High electron flow density and stable electrical discharge can then be achieved.

On the other hand, mercury ions generated during electrical discharge drift from the opposing electrode and hit electrode cylinder 27 that is made of semiconductor ceramics with a coating having good anti-sputtering properties. Deterioration is prevented by the electrode cylinder 27 with the anti-sputtering coating and electrons are continuously and abundantly emitted without hitting the semiconductor ceramics 33 placed in the electrode cylinder.

The anti-sputtering coating is prepared in the firing and reducing process. It is preferable to use TiC, ZrC, ZrN, NbC, NbN, MoC, LaC, TaC, HfC, or WC having melting points of 2000° C. or higher, or more preferably, to use TiC, ZrC, NbC, TaC, ZrN, TaN, or HfN having melting points of 3000° C. or more.

Next, description will be given on a comparison of service life when the electrodes are changed, referring to Table 11.

The discharge lamp under test is 200 mm in tube length, 10 mm in tube diameter, and the tube atmosphere contains Ar+Hg. Electrical discharge is started by a pulse voltage, and not by a preheating circuit. The applied alternating current is 50 Hz in frequency and the lamp current is 100 mA rms.

TABLE 11

| | | Continuous lighting | | ON/OFF lighting (2.5 min. ON/ 0.5 min. OFF) | |
|---|---|---|---|---|---|
| | | Initial (lm) | After 1000 hr (lm) | Initial (lm) | After 1000 hr (lm) |
| A: | Present invention Sample 3 | 580 | 550 | 580 | 550 |
| B: | BaTiO$_3$ semi-conductor ceramics | 560 | 450 | 560 | Crack |
| C: | Ni electrode (commercial product) | 560 | 390 | 560 | 280 |
| D: | Filament (commercial product) | 580 | 550 | 580 | Not lighten |

From the test results shown in Table 11, it is evident that, in the electrode according to the present invention, damage due to sputtering is lower than in a BaTiO$_3$ ceramic electrode. Thus, blackening of tube wall is decreased, and light beam deterioration is reduced.

Also, the electrode is not cracked because it has high thermal shock resistance.

Compared with a Ni electrode, the electrode of the present invention is highly resistant to sputtering and reduces light beam deterioration. Further, when compared with a tungsten filament electrode, there is no difference in light beam deterioration in the case of continuous lighting. In an ON/OFF lighting test, however, the tube wall is blackened by sputtering in the case of the tungsten filament electrode because no preheating is performed, while the electrode of the present invention is less damaged by sputtering, and deterioration of the light beam is suppressed.

As described above, with the electrode of the present invention, it is possible to obtain the same electrode properties as the tungsten filament electrode currently used, even when a preheating circuit is not used, because the electrode is highly resistant to ion sputtering and has a high thermal shock resistance.

Figure 6:
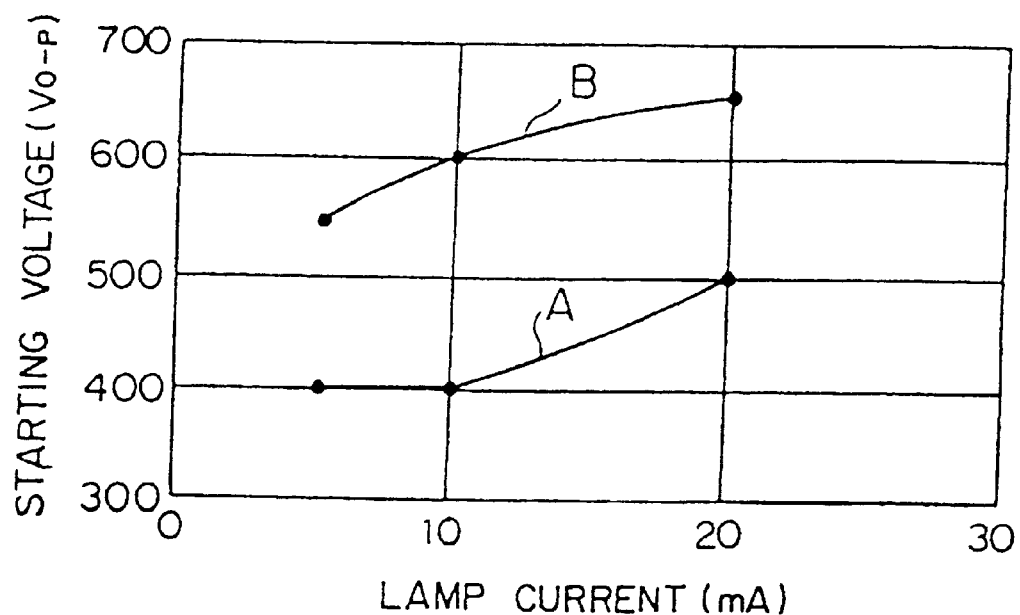
FIG. 6 is a graph showing the relationship between lamp current and discharge starting voltage.
Figure 7:
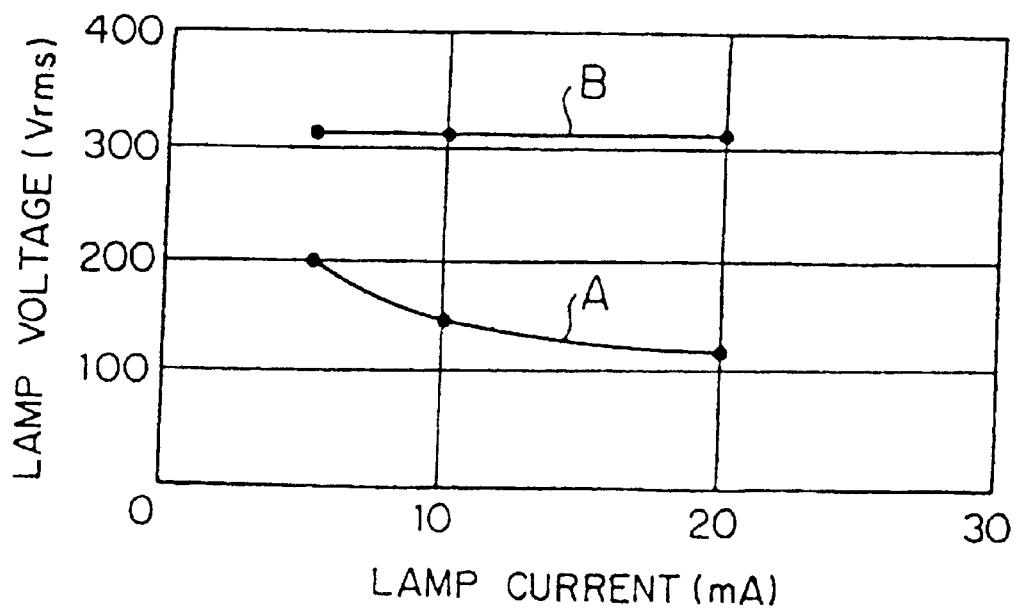
FIG. 7 is a graph showing the relationship between lamp current and lamp voltage.
Figure 8:
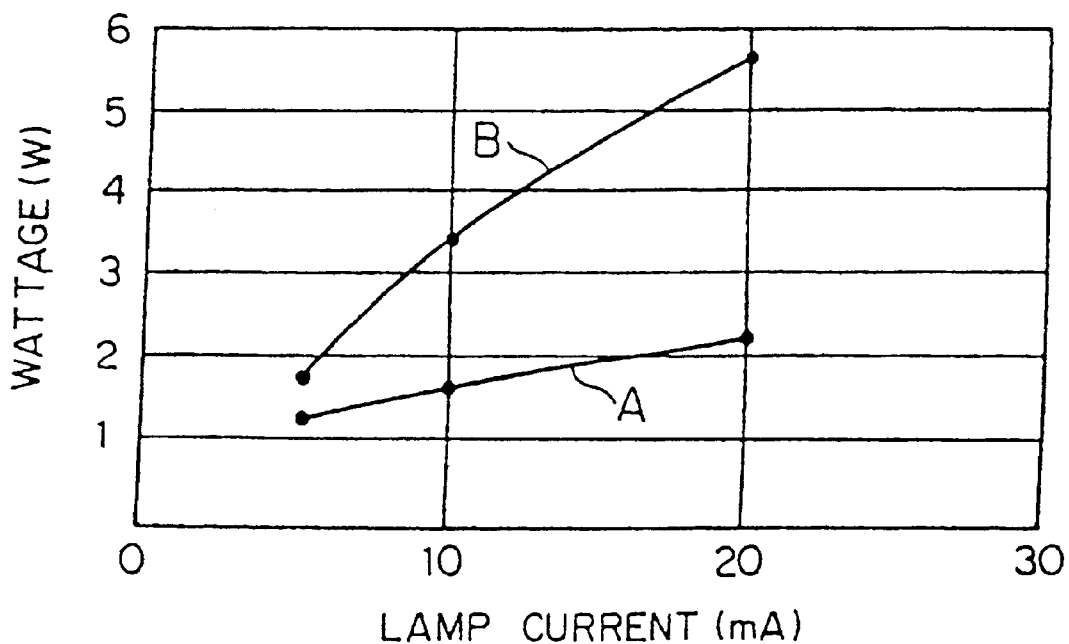
FIG. 8 is a graph showing the relationship between lamp current and lamp wattage.

Description will be given on the properties of a discharge lamp using the electrode of the present invention in connection with FIG. 6 to FIG. 8. FIG. 6 shows the relationship between lamp current and discharge starting voltage, FIG. 7 shows the relationship between lamp current and lamp voltage, and FIG. 8 gives the relationship between lamp current and lamp wattage. In FIGS. 6–8, "A" represents the case where discharge lamp electrode of the present invention is used, and "B" shows the case using a conventional nickel electrode.

For the characteristic test, a discharge lamp of 10 mm in glass tube diameter and 200 mm in total length was used, and high frequency current of 30 kHz was applied by an inverter.

In the relationship between lamp current and starting voltage shown in FIG. 6, the voltage is 550 V in case B where a conventional nickel electrode was used, while it was 400 V in case A where the electrode of the present invention was used, the latter being 150 V lower than the former. From this, it is evident that the electrode of the present invention has a higher electron emission property.

In the relationship between lamp current and lamp voltage shown in FIG. 7, the voltage remains at a constant level even when the lamp current increases in case B with the conventional nickel electrode, while, in case A using the electrode of the present invention, the lamp voltage decreases as the lamp current increases. The voltage drops to about 190 V rms when the tube current is 20 mA. From this, it is evident that lamp voltage of the discharge lamp using the electrode of the present invention is low.

In the relationship between lamp current and lamp wattage shown in FIG. 8, the increasing ratio of wattage is high in case B with the conventional nickel electrode, while it is low even when lamp current increases in case A where the electrode of the present invention is used. From this, it is evident that power consumption is low in the discharge lamp using the electrode of the present invention.

Next, referring to FIGS. 9a, 9b to FIG. 14, description will be given on embodiments of the second aspect of the present invention, in which the diameter of the glass tube of the ceramic electrode fluorescent discharge lamp is reduced.

In FIGS. 9a–14, the mercury dispenser shown in each of the embodiments of FIG. 9a to FIG. 11 is disposed with spacing from the semiconductor ceramic cylinder with the closed bottom, while the mercury dispenser in each of the embodiments shown in FIG. 12a to FIG. 14 is disposed without spacing (i.e., adjacent to) from the semiconductor ceramic cylinder with the closed bottom.

Figure 9A:
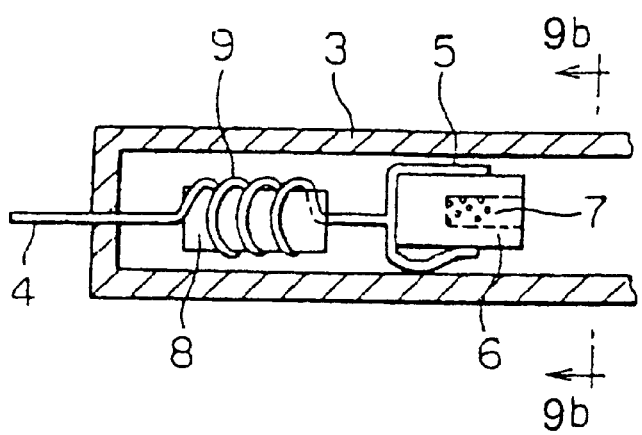
FIG. 9a is a cross-sectional view of a first embodiment of a tube end of a discharge lamp of the present invention.
Figure 9B:
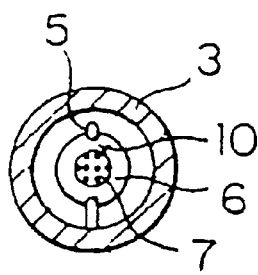

FIGS. 9a and 9b are enlarged cross-sectional views of a tube end of a first embodiment of the ceramic electrode discharge lamp according to the second aspect of the invention. FIG. 9a is an enlarged cross-sectional view along the axial direction of the tube, and FIG. 9b is an enlarged cross-sectional view along line b—b of FIG. 9a.

In the figures, reference numeral 3 represents a cylindrical, sealed glass tube container with fluorescent material coated on the inner wall, and lead wires 4 made of heat-resistant metal, i.e. tungsten, mounted on the left and right lateral ends of the glass tube container.

At an end of the lead wire, a plurality of branches 5 are provided, and a semiconductor ceramic cylinder 6 with closed bottom and one end open, made of semiconductor ceramics having a high melting point or good anti-sputtering property (e.g. semiconductor ceramics of $Ba(Zr,Ta)O_3$ type), is elastically held by branches 5. In the semiconductor ceramic cylinder 6 with closed bottom, massive, granular, or porous electron emitting semiconductor ceramics 7 are accommodated. Also, semiconductor ceramic cylinder 6 with closed bottom has an anti-sputtering layer containing Ta on the surface thereof.

The semiconductor ceramic cylinder 6 with closed bottom is 0.9 mm in inner diameter, 1.9 mm in outer diameter and 2.3 mm in length, or 1.6 mm in inner diameter, 2.6 mm in outer diameter, and 2.3 mm in length.

The mercury dispenser 8 is arranged between the semiconductor ceramic cylinder 6 with closed bottom and the lead-in portion of the lead wire 4, and it is held by winding 9 of lead wire 4.

As shown in FIG. 9b, at least one groove 10 is formed in an axial direction on the outer periphery of the semiconductor ceramic cylinder 6 with closed bottom. The semiconductor ceramic cylinder and the end of the lead wire are fixed by the branches engaged with the groove.

Figure 10:
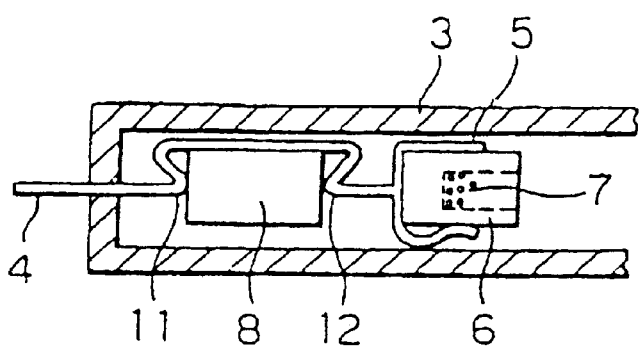
FIG. 10 is a cross-sectional view of a second embodiment of a tube end of discharge lamp of the present invention.

FIG. 10 is an enlarged cross-sectional view of a tube end of a second embodiment of the ceramic electrode fluorescent discharge lamp, in which the present invention is applied.

This ceramic electrode fluorescent discharge lamp is sealed in a glass tube 3 similar to the ceramic electrode fluorescent discharge lamp of the first embodiment shown in FIG. 9. The semiconductor ceramic cylinder 6 with closed bottom with one end open is elastically held by branches 5 of lead wire 4, and massive, granular or porous electron emitting semiconductor ceramics 7 are accommodated in this semiconductor ceramic cylinder 6 with closed bottom. A bottom semiconductor ceramics having a high melting point and good anti-sputtering properties, e.g. semiconductor ceramics of the $Ba(Zr, Ta)O_3$ type, are used for the semiconductor ceramic cylinder 6 with closed bottom. In particular, a Ta layer is formed on the surface of the ceramics and is used as an anti-sputtering layer.

Z-shaped bending portions 11 and 12 are formed in the middle of lead wire 4. Mercury dispenser 8 is disposed between the semiconductor ceramic cylinder 6 with closed bottom and a lead-in portion of the lead wire. The dispenser 8 is held by the resilient force of the Z-shaped bending portions 11 and 12.

Figure 11:
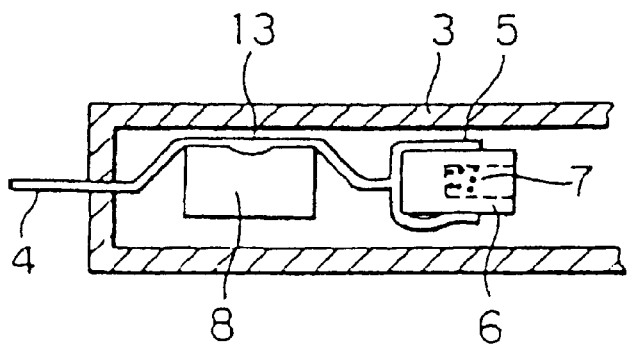
FIG. 11 is a cross-sectional view of a third embodiment of a tube end of a discharge lamp of the present invention.

FIG. 11 is an enlarged cross-sectional view of a tube end of a ceramic electrode fluorescent discharge lamp of a third embodiment. This ceramic electrode fluorescent discharge lamp is sealed in a glass tube 3 similarly to the first embodiment of FIG. 9. A plurality of branches 5 are provided at an end of the lead wire 4, and a semiconductor ceramic cylinder 6 with closed bottom with one end open is elastically held by the branches. In the semiconductor ceramic cylinder 6 with a closed bottom, massive, granular, or porous electron emitting semiconductor ceramics 7 are accommodated. Semiconductor ceramics having a high melting point or good anti-sputtering properties, e.g. semiconductor ceramics of the $Ba(Zr,Ta)O_3$ type, are used for the semiconductor ceramic cylinder 6 with closed bottom. A Ta layer is formed on the surface of the ceramics and is used as an anti-sputtering layer.

The mercury dispenser 8 is disposed between the semiconductor ceramic cylinder 6 with closed bottom and a lead-in portion of the lead wire. The dispenser 8 is fixed by a welding portion 13 in the middle of the lead wire 4.

Figure 12A:
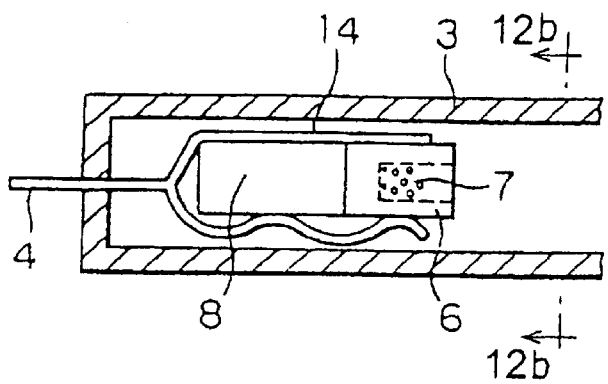
FIG. 12a is a cross-sectional view of a fourth embodiment of a tube end of a discharge lamp of the present invention.
Figure 12B:
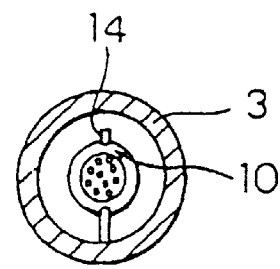

FIGS. 12a and 12b are enlarged cross-sectional views of a tube end of a fourth embodiment. FIG. 12a is an enlarged cross-sectional view along an axial line of the tube, and FIG. 12b is an enlarged cross-sectional view along line b—b of FIG. 12a.

This ceramic electrode fluorescent discharge lamp is sealed in a glass tube container 3 similarly to the ceramic electrode fluorescent discharge lamp of the first embodiment shown in FIG. 9. In the semiconductor ceramic cylinder 6 with closed bottom with one end open, massive, granular, or porous electron emitting semiconductor ceramics 7 are accommodated. Semiconductor ceramics having a high melting point or good anti-sputtering properties, e.g. semiconductor ceramic of the $Ba(Zr,Ta)O_3$ type, are used for the semiconductor ceramic cylinder 6 with closed bottom. In particular, a Ta layer is formed on the surface of the ceramics and are used as an anti-sputtering layer.

The semiconductor ceramic cylinder 6 with closed bottom is 0.9 mm in inner diameter, 1.9 mm in outer diameter, and 2.3 mm in length, or 1.6 mm in inner diameter, 2.6 mm in outer diameter, and 2.3 mm in length.

Mercury dispenser 8 is disposed between the semiconductor ceramic cylinder 6 with closed bottom and a lead-in portion of the lead wire 4, and adjacent to the semiconductor ceramic cylinder 6 with closed bottom. Mercury dispenser 8 and the semiconductor ceramic cylinder 6 with closed bottom are elastically held by a plurality of branches 14 provided at the end of lead wire 4.

As shown in FIG. 12b, at least one groove 10 is formed in an axial direction on the outer periphery of the semiconductor ceramic cylinder 6 with closed bottom and mercury dispenser 8. Branches 14 are engaged with the groove.

Figure 13A:
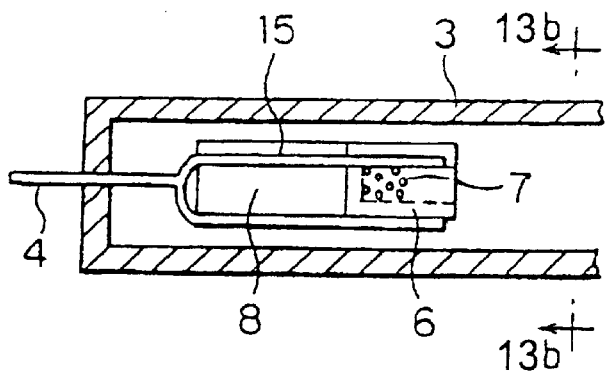
FIG. 13a is a cross-sectional view of a fifth embodiment of a tube end of a discharge lamp of the present invention.
Figure 13B:
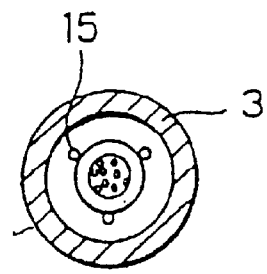

FIGS. 13a and 13b are enlarged cross-sectional views of a tube end of a fifth embodiment of a ceramic electrode discharge lamp of the present invention. FIG. 13a is an enlarged cross-sectional view along an axial line of the tube, and FIG. 13b is an enlarged cross-sectional view along line b—b in FIG. 13a. This ceramic electrode fluorescent discharge lamp is sealed in glass tube container 3 similarly to the ceramic electrode fluorescent discharge lamp of the fourth embodiment shown in FIG. 12. In the semiconductor ceramic cylinder 6 with closed bottom with one end open, massive, granular or porous electron emitting semiconductor ceramics 7 are accommodated. Semiconductor ceramics having a high melting point or good anti-sputtering properties, e.g. semiconductor ceramics of a $Ba(Zr,Ta)O_3$ type, are used for the semiconductor ceramic cylinder 6 with closed bottom. In particular, a Ta layer is formed on the surface of the ceramics and is used as an anti-sputtering layer.

Mercury dispenser 8 is disposed between the semiconductor ceramic cylinder 6 with closed bottom and a lead-in portion of lead wire 4, and adjacent to the semiconductor ceramic cylinder 6 with closed bottom. Mercury dispenser 8 and the semiconductor ceramic cylinder 6 with closed bottom are squeezed and held by a plurality of branches 15 provided at the end of lead wire 4.

Figure 14:
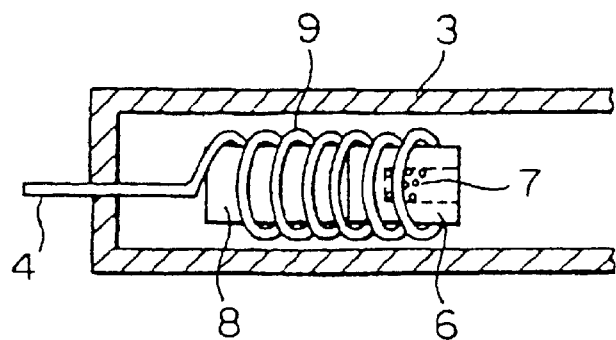
FIG. 14 is a cross-sectional view of a sixth embodiment of a tube end of a discharge lamp of the present invention.

FIG. 14 is an enlarged cross-sectional view of a tube end of a sixth embodiment of the ceramic electrode discharge lamp according to the present invention. In this figure, reference numeral 3 represents a cylindrical sealed glass tube container having fluorescent material coated on the inner wall. Lead wires 4 made of heat-resistant metal, i.e. tungsten, are arranged on the left and right lateral ends of the glass tube container.

In the semiconductor ceramic cylinder 6 with closed bottom with one end open, made of semiconductor ceramics having high melting point or good anti-sputtering property, e.g. semiconductor ceramics of $Ba(Zr,Ta)O_3$ type, massive, granular or porous electron emitting semiconductor ceramics 7 are accommodated. An anti-sputtering layer of Ta is formed on the surface of the semiconductor ceramic cylinder 6 with closed bottom.

Mercury dispenser 8 is disposed between the semiconductor ceramic cylinder 6 with closed bottom 6 and a lead-in portion of the lead wire 4, and adjacent to the semiconductor ceramic cylinder 6 with closed bottom. Windings 9 of the lead wire 4 are provided around mercury dispenser 8 and the semiconductor ceramic cylinder 6 with closed bottom. Mercury dispenser 8 and the semiconductor ceramic cylinder 6 with closed bottom are thus held by the winding portion 9.

INDUSTRIAL APPLICABILITY

As it is evident from the above description, the following effects can be obtained by the electrode material for the discharge lamp according to the present invention:

1) Thermal shock resistance is improved.
(2) Service life of the discharge lamp can be extended because sputtering is decreased.
(3) Surface resistance is low, and heat loss can be reduced.
(4) Preheating current circuit is not required.
(5) Lamp voltage is low, and energy is saved.
(6) Restriking voltage is low and fade-out does not easily occur.
(7) Highly resistant to frequent ON-OFF operation.
(8) Electron emission property is high, and electron flow density is high.
(9) Because surface resistance is low, the product can be used for various applications as an electrode or conductor.

Further, by crushing the composition material to 25 μm or less in average particle size, it is possible to obtain stable and satisfactory ceramics with broader composition range and firing temperature range.

The electrode for a discharge lamp using the electrode material according to the present invention comprises lead wires arranged at a given spacing within a glass tube, in which rare gas or mercury vapor is sealed, and a semiconductor ceramic cylinder fixed on an end of the lead wire, the cylinder having a hollow bore with one end open. Because massive, granular or porous semiconductor ceramics are accommodated in the bore of the cylindrical semiconductor ceramics, it is possible to obtain a discharge lamp electrode for which there is no need of preheating by glow discharge, and which has excellent electron emitting property, low discharge starting voltage and lamp voltage, high electron flow density and low power consumption suitable for energy-saving purposes.

Therefore, when the discharge lamp electrode of the present invention is used, it is possible to obtain a discharge lamp that has good electron emitting properties, low discharge starting voltage and lamp voltage, and low power consumption. Also, there is no need of preheating, and compact design can be achieved in terms of structure. Thus, the tube diameter of the discharge lamp can be reduced.

Using the compositions and the manufacturing method as described above, a discharge lamp electrode can be produced, which is in a cylindrical shape with a closed bottom, has one end open, and a bore; and which contains massive, granular, or porous semiconductor ceramics having a heat insulating effect in the bore. For this discharge lamp electrode, there is no need for preheating. Further, it has excellent electron emission properties, low lamp voltage and restriking voltage, long service life to ON-OFF operation, high thermal shock resistance, and high electron flow density.

For the ceramic electrode fluorescent discharge lamp, in which the semiconductor ceramic cylinder with closed bottom and the mercury dispenser of the present invention are disposed in series, a glass tube container with smaller diameter can be used, thus contributing to the thin design of a liquid crystal display unit.

What we claim is:

1. An electrode material for a discharge lamp, comprising:
    a first component of 0.5 to 1.5 mols selected from a group consisting of BaO, CaO and SrO;
    a second component of 0.05 mol to less than 0.3 mol or of more than 0.7 mol to 0.95 mol selected from a group consisting of $ZrO_2$ and $TiO_2$; and
    a third component of 0.025 to less than 0.3 mol selected from a group consisting of $V_2O_5$, $Nb_2O_5$, $Ta_2O_5$, $Sc_2O_3$, $Y_2O_3$, $La_2O_3$, $Dy_2O_3$ and $Ho_2O_3$, or 0.05 to less than 0.15 mol or more than 0.35 to 0.95 mol selected from a group consisting of $HfO_2$, $CrO_3$, $MoO_3$ and $WO_3$.

2. An electrode material for a discharge lamp according to claim 1, wherein a conductor layer or a semiconductor layer having a principal component selected from a group consisting of V, Nb, Ta, Sc, Y, La, Dy, Ho, Hf, Cr, Mo, W, and the oxides, nitrides and carbides of V, Nb, Ta, Sc, Y, La, Dy, Ho, Hf, Cr. Mo and W, is formed on a surface of said electrode material.

3. A discharge lamp electrode, wherein a massive, granular, or porous electrode material comprising a first component of 0.5 to 1.5 mols selected from a group consisting of BaO, CaO and SrO, a second component of 0.05 to less than 0.3 mol or more than 0.7 to 0.95 mol selected from a group consisting of $ZrO_2$ and $TiO_2$, and a third component of 0.025 to less than 0.3 mol selected from a group consisting of $V_2O_5$, $Nb_2O_5$, $Ta_2O_5$, $Sc_2O_3$, $Y_2O_3$, $La_2O_3$, $Dy_2O_3$, and $Ho_2O_3$, or 0.05 to less than 0.15 mol or more than 0.35 to 0.95 mol selected from a group consisting of $HfO_2$, $CrO_3$, $MoO_3$ and $WO_3$; and a cylindrical semiconductor ceramic container with a closed bottom in which said massive, granular, or porous electrode material is accommodated.

4. A discharge lamp electrode wherein a massive, granular, or porous electrode material comprising a first component of 0.5 to 1.5 mols selected from a group consisting of BaO, CaO and SrO, a second component of 0.05 to less than 0.3 mol or more than 0.7 to 0.95 mol selected from a group consisting of $ZrO_2$ and $TiO_2$, and a third component of 0.025 to less than 0.3 mol selected from a group consisting of $V_2O_5$, $Nb_2O_5$, $Ta_2O_5$, $Sc_2O_3$, $Y_2O_3$, $La_2O_3$, $Dy_2O_3$, and $Ho_2O_3$, or 0.05 to less than 0.15 mol or more than 0.35 to 0.95 mol selected from a group consisting of $HfO_2$, $CrO_3$, $MoO_3$ and $WO_3$; and a cylindrical semiconductor ceramic container with a closed bottom in which said massive, granular, or porous electrode material is accommodated, wherein surfaces of said cylindrical semiconductor ceramic container with a closed bottom and said massive, granular, or porous electrode material are coated with conductive material having a high melting point.

5. A discharge lamp electrode according to claim 4, wherein the conductive material having a high melting point is an oxide, a nitride, or a carbide having a melting point of 1400° C. or higher.

6. An electrode material for a discharge lamp wherein a massive, granular, or porous electrode material comprising:

a first component of 0.5 to 1.5 mols selected from a group consisting of BaO, CaO and SrO;

a second component of 0.05 to less than 0.3 mol or more than 0.7 to 0.95 mol selected from a group consisting of $ZrO_2$ and $TiO_2$;

and a third component of 0.025 to less than 0.3 mol selected from a group consisting of $V_2O_5$, $Nb_2O_5$, $Ta_2O_5$, $Sc_2O_3$, $Y_2O_3$, $La_2O_3$, $Dy_2O_3$ and $Ho_2O_3$, or 0.05 to less than 0.15 or more than 0.35 to 0.95 mol selected from a group consisting of $HfO_2$, $CrO_3$, $MoO_3$ and $WO_3$.

7. The electrode material for said discharge lamp according to claim 6 wherein a conductor layer or a semiconductor layer having a principal metal component selected from a group consisting of V, Nb, Ta, Sc, Y, La, Dy, Ho, Hf, Cr, Mo, W, and the oxides, nitrides, and carbides of V, Nb, Ta, Sc, Y, La, Dy, Ho, Hf, Cr, Mo and W is formed on the surface of said electrode material for said discharge lamp.

* * * * *